United States Patent [19]
Lowe et al.

[11] Patent Number: 4,581,900
[45] Date of Patent: Apr. 15, 1986

[54] METHOD AND APPARATUS FOR DETECTING SURGE IN CENTRIFUGAL COMPRESSORS DRIVEN BY ELECTRIC MOTORS

[75] Inventors: Madeleine M. Lowe, Contoocook, N.H.; Robert T. Hagerman, York, Pa.

[73] Assignee: Borg-Warner Corporation, Chicago, Ill.

[21] Appl. No.: 685,686

[22] Filed: Dec. 24, 1984

[51] Int. Cl.[4] .............................................. F25B 1/00
[52] U.S. Cl. .................................... 62/228.1; 62/129; 415/17
[58] Field of Search ............... 62/129, 126, 203, 204, 62/208, 209, 210, 215, 217, 226, 228.1, 228.3, 228.4, 228.5, 230; 415/17, 27, 28; 417/19, 20, 26, 43, 45

[56] References Cited

U.S. PATENT DOCUMENTS

| | | | |
|---|---|---|---|
| 3,963,367 | 6/1976 | Stalker et al. | 415/17 |
| 4,164,033 | 8/1979 | Glennon et al. | 415/17 X |
| 4,177,649 | 12/1979 | Venema | 62/228.4 X |
| 4,259,845 | 4/1981 | Norbeck | 62/228.1 X |
| 4,282,718 | 8/1981 | Kountz et al. | 62/228.1 X |

Primary Examiner—Harry B. Tanner
Attorney, Agent, or Firm—James E. Tracy

[57] ABSTRACT

A surge detection apparatus for use in a refrigeration system having a centrifugal compressor driven by an electric motor includes a first pressure transducer for sensing a condenser pressure and a second pressure transducer for sensing an evaporator pressure. A first bandpass digital filter responsive to the condenser pressure and the evaporator pressure is provided for generating a first signal representative of the rate of change of the pressure developed across the compressor. A current transformer is used to sense a current in the electric motor driving the compressor. A second bandpass digital filter responsive to the motor current is provided for generating a second signal representative of the rate of change of the RMS current being drawn by the compressor drive motor. A third signal representative of a differential pressure threshold and a fourth signal representative of a first motor current threshold and a second motor current threshold are provided. A computing device responsive to the first through fourth signals indicates when a valid surge is occurring in the compressor.

21 Claims, 5 Drawing Figures

METHOD AND APPARATUS FOR DETECTING SURGE IN CENTRIFUGAL COMPRESSORS DRIVEN BY ELECTRIC MOTORS

BACKGROUND OF THE INVENTION

1. Field of the Invention

This invention relates generally to surge detection devices and more particularly, it relates to a method and apparatus for detecting surge in a compressor of a compressor-driven system.

The invention is susceptible of widely diverse use and may be applied to any system having equipment driven by a compressor, such as in a chemical process, pump and the like.

2. Description of the Prior Art

As is generally known, surge or surging is an unstable condition that may occur when centrifugal compressors are operated at light loads and high pressure ratios. It is a transient phenomenon which is characterized by high frequency oscillations in pressures and flow and in some cases, there may even be a complete flow reversal through the compressor. Such continuous surging causes excessive vibrations in both the rotating and stationary components of the compressor, which may cause permanent damage thereto. Heretofore, surge detection devices of the prior art required measurements of the compressor head and suction flow, and surge was avoided by opening a bypass valve.

It has been discovered in the present invention that surge indirectly influences the drive system for the compressor. In particular, at surge conditions there exists a momentary reduction in flow and pressure developed across the compressor. Further, there will be a reduction in the net torque and mechanical power which are carried by the compressor drive shaft. In the case of where the drive device is an electric motor, these oscillations in torque and power will cause oscillations in motor current and electrical power consumption. It has been found that motor current and differential pressure change much more rapidly during surge than during any normal changes in capacity or load. As the load on the compressor increases, the rate of change of the differential pressure and of the motor current will also increase during a surge condition. The duration of the surge disturbance of motor current and differential pressure remain substantially constant over a wide range of loads and is substantially shorter than the duration of normal load fluctuations.

It will therefore be desirable to provide an improved surge detection arrangement for use in refrigeration systems having a centrifugal compressor driven by an electric motor which is based upon the rate of change of pressure developed across the compressor and the rate of change of the current drawn by the compressor drive motor.

SUMMARY OF THE INVENTION

Accordingly, it is a general object of the present invention to provide a method and apparatus for detecting surge in a compressor of compressor-driven system.

It is an object of the present invention to provide a surge detection apparatus for use in refrigeration systems having a centrifugal compressor driven by an electric motor which is based upon the rate of change of pressure developed across the compressor and the rate of change of the current drawn by the compressor drive motor.

It is another object of the present invention to provide a surge detection apparatus which includes a microprocessor responsive to the rate of change of the pressure developed across the compressor and the rate of change of the RMS current being drawn by the compressor drive motor for indicating when a valid surge is occurring in the compressor.

It is still another object of the present invention to provide a surge detection apparatus for use in a refrigeration system which includes a first bandpass digital filter for generating a signal representative of the rate of change of the pressure developed across the compressor and a second bandpass digital filter for generating a signal representative of the rate of change of the RMS current being drawn by the compressor drive motor.

In accordance with these aims and objectives of the present invention, there is provided a surge detection apparatus for use in a refrigeration system having a centrifugal compressor driven by an electric motor which includes means for sensing a condenser pressure and means for sensing an evaporator pressure. Means responsive to the condenser pressure and the evaporator pressure is provided for generating a first signal representative of the rate of change of the pressure developed across the compressor. There is also provided means for sensing a current in the electric motor driving the compressor. Means responsive to the motor current is provided for generating a second signal representative of the rate of change of the RMS current being drawn by the compressor drive motor. There are also provided means for generating a third signal representative of a differential pressure threshold and means for generating a fourth signal representative of a first motor current threshold and a second motor current threshold. A microprocessor is responsive to the first through fourth signals for indicating when a valid surge is occurring in the compressor.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

It is to be distinctly understood at the outset that the present invention shown in association with a refrigeration system is not intended to serve as a limitation upon the scope or teachings thereof, but is merely for the purpose of convenience of illustration of one example of its application. The present invention has numerous applications in other fields and apparatus since the invention pertains to a method and apparatus for detecting surge in a compressor of a compressor-driven system.

Figure 1:
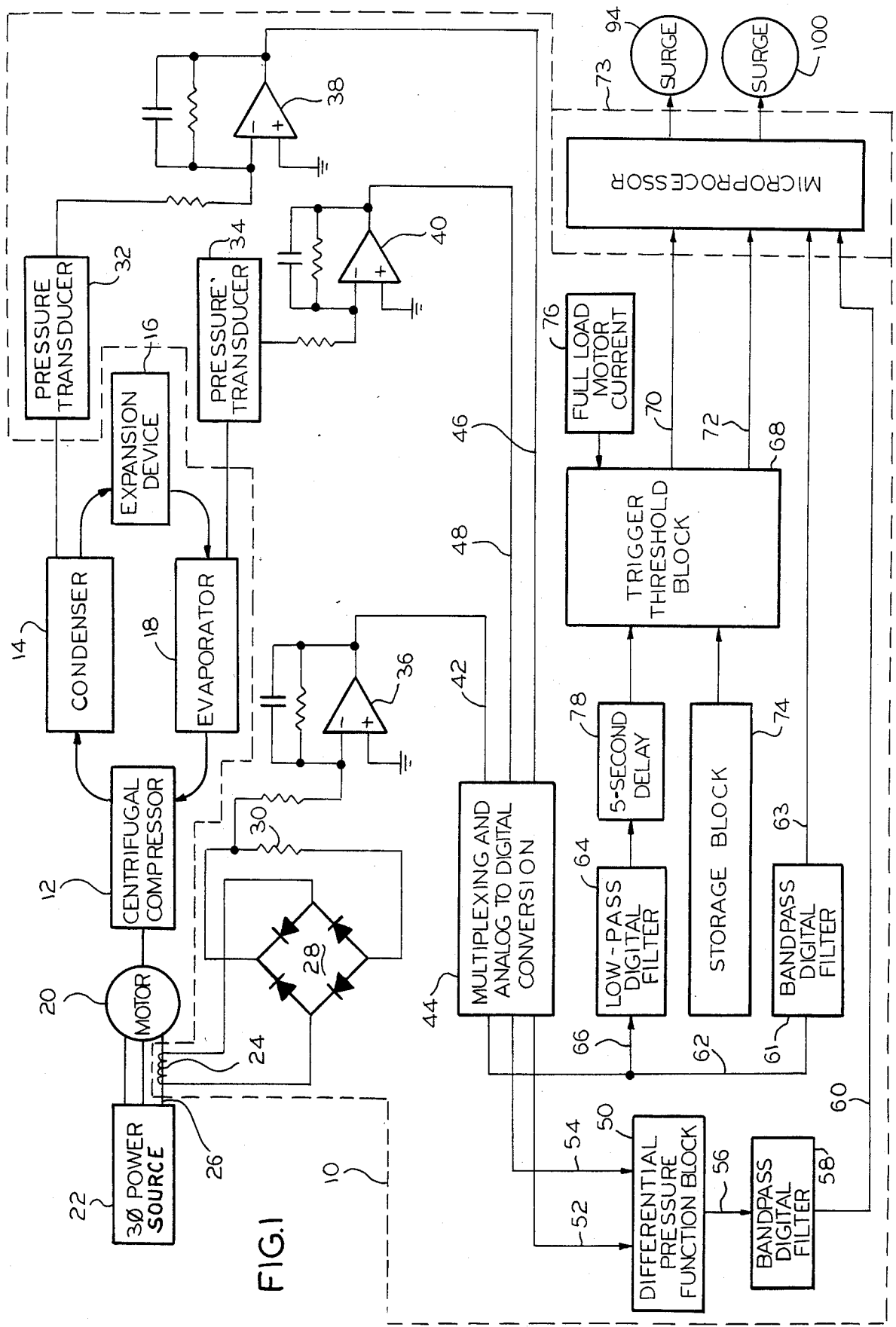
FIG. 1 is a block diagram of a surge detection apparatus of the present invention for use in a refrigeration system having a centrifugal compressor driven by an electric motor.

Referring now in detail to the various views of the drawings, there is shown in FIG. 1 in block diagram form a surge detection apparatus 10 of the present invention for use in a refrigeration or cooling system having a centrifugal compressor driven by an electric motor. Reference is made to the teachings in a concurrently filed patent application Ser. No. 685,685 in the name of Kenneth J. Kountz, which is assigned to the same assignee as the present invention, for a specific illustration and explanation of the details of one such refrigeration system adapted to utilize the surge detection apparatus to be disclosed herein. In that copending application, a self-optimizing capacity control system is shown for inverter-driven centrifugal compressor based water chillers wherein adjustable inlet guide vanes and compressor speed are both automatically regulated in response to a continually updated "learned" chiller surge surface so as to realize minimum overall chiller energy consumption. In order to obtain the "learned" surge surface, the control system includes a microprocessor for initiating a "learning" mode in which the compressor motor speed is continually decreased incrementally and the pre-rotational guide vanes are moved to a more open position until an operating point is found where the compressor is surging. The microprocessor determines whether the compressor is surging in response to surge detection signals which may be generated by the surge detection apparatus of the present invention.

For convenience of illustration, the surge detection apparatus 10 is depicted in FIG. 1 in connection with a simplified version of a refrigeration system. The refrigeration system includes a centrifugal compressor 12, a condenser 14, an expansion device 16 and an evaporator 18, all being interconnected in series to form a conventional closed refrigeration circuit. Refrigerant gas is compressed in the compressor 12 and the compressed gas is delivered to the condenser 14 where a cooling medium, such as water from a cooling tower, causes the compressed gas to condense to a liquid refrigerant. The liquid refrigerant expands as it is passed through the expansion device 16 to the evaporator 18. As the liquid refrigerant flows through the evaporator 18, circulating water from a building is in heat exchange relationship with the refrigerant so as to cause it to assume a vaporized state for delivery to a suction inlet of the compressor. In this manner, the water is chilled in the evaporator 18 for cooling the building. In order to vary the amount of cooling imparted to the building in response to changes in the cooling requirement or load, the capacity of the compressor 12 is adjusted by regulating the flow rate of the refrigerant through the refrigeration system to vary its capacity.

It is generally known that a surge may cause permanent damage to the compressor if it is allowed to occur frequently and for long periods of time. Thus, in any application it is important to know when the compressor is surging. The surge detection apparatus 10 of the present invention will now be described in detail with reference to the refrigeration system of FIG. 1.

The surge detection apparatus 10 includes motor current sensing means formed of a current transformer 24 which is connected to one phase line 26 of a three-input power source connections for driving a three-phase AC induction motor 20 for measuring the current flowing therein. The AC output voltage from the current transformer 24 is converted to a D.C. voltage signal by a conventional full-wave bridge rectifier 28 and a load resistor 30. A first pressure transducer 32 is placed in the condenser 14 to produce a signal which is a function of either the absolute or gauge pressure in the condenser 14. A second pressure transducer 34 is placed in the evaporator 18 for producing a signal which is a function of either the absolute or gauge pressure in the evaporator 18. It should be understood by those skilled in the art that the transducers 32 and 34 could be located in the respective discharge line and suction line of the compressor 12.

The D.C. output voltage from the load resistor 30 is fed to a first low-pass filter circuit 36. The output of the first pressure transducer 32 is fed to a second low-pass filter circuit 38, and the output of the second pressure transducer 34 is fed to a third low-pass filter circuit 40. The function of these low-pass filters is to eliminate high frequency harmonics which may cause distortion. The "cut-off" or "break-frequency" of these filters are typically selected to be equal to one-half of the frequency at which the measured or sensed voltages are sampled. Since it is desirable to use a sample frequency of two hz in the present invention, the filters are designed with a "cut-off" frequency of one hz. The output signal of the filter 36 representative of the motor current on line 42 is connected to a multiplexer and A/D converter 44. Similarly, the output signal of the filter 38 representative of the condenser pressure on line 46 and the output signal of the filter 40 representative of the evaporator pressure on line 48 are also coupled to the multiplexer and A/D converter 44.

A differential pressure function block 50 receives as inputs the condenser and evaporator pressure signals via respective line 52, 54 and generates a differential signal on its output line 56. The block 50 subtracts the evaporator pressure signal on line 54 from the condenser pressure signal on line 52. A first bandpass digital filter 58 is connected to the output line 56 for producing a filtered rate of change of differential pressure signal on line 60 which is referred to as a "DIFFPFILT" signal. A second bandpass digital filter 61 has its input connected to the motor current signal on line 62 for producing a filtered rate of change of motor current signal on line 63 which is referred to as a "MAMPSFILT" signal. A low-pass digital filter 64 has its input connected to the motor current signal via line 66 for producing a RMS motor current value being drawn by the induction motor 20.

A trigger threshold block 68 calculates a filtered current threshold signal designated as a "MAMPSREF" signal on line 70 and a filtered differential pressure threshold signal designated as a "DIFFPREF" signal on line 72. The surge detection thresholds are based on the filtered current and filtered differential pressure spikes or peaks which have been measured and stored in a storage block 74 during an induced light load surge when the surge detection apparatus is initially calibrated. In order to increase the reliability of detecting surge, the stored trigger thresholds MAMPSREF 0 and DIFFPREF 0 are selected to be approximately thirty to fifty percent less than the peaks which are actually measured during the induced surge.

Figure 3:
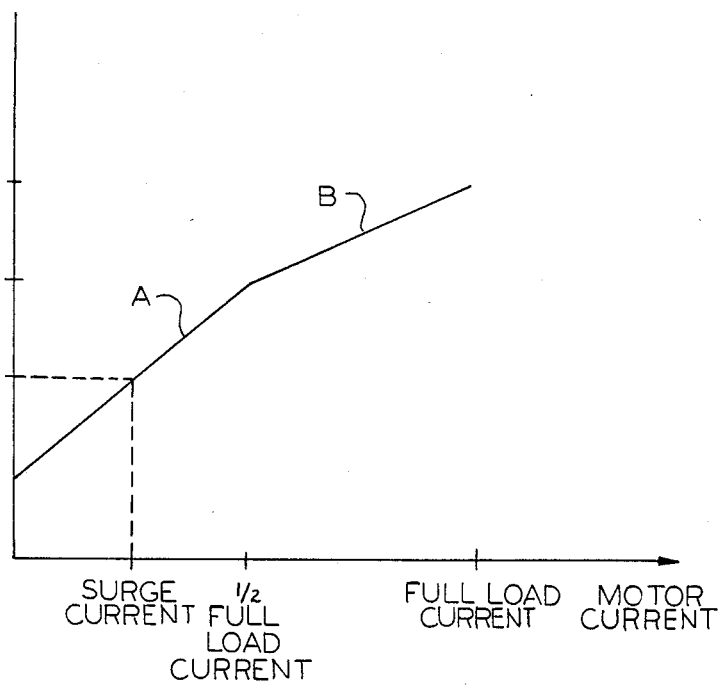
FIGS. 3, 4 and 5 are graphical illustrations useful in understanding the operation of the present invention in FIGS. 1 and 2.

It has been experienced that the trigger thresholds at light loads are not entirely accurate over the entire compressor load range. This is because the magnitude of normal load and capacity fluctuations increase as the load on the compressor increases. These fluctuations create disturbances in the filtered current and differential signals which likewise increase in magnitude with the load increase. In other words, the filtered current and filtered differential pressure signals are more noisy at high loads. Thus, a problem of the false indication of surge would increase if the thresholds were maintained constant. Due to the non-linear relationship between the motor current and load, a threshold curve is required to be implemented as shown in FIG. 3 so as to increase the reliability of the surge detection apparatus. As can be seen, the motor current and differential pressure thresholds MAMPSREF 0 and DIFFPREF 0 increase by fifty percent over the range of RMS motor current shown on the abscissa in the curve portion A. Further, the motor current and differential pressure thresholds increase by another fifty percent in the curve portion B. Thus, the magnitude of the trigger thresholds doubles between the motor current measurements during light load surge and the full load rated RMS current for the motor. The curve of FIG. 3 is generated by a full load motor current functional block 76 (FIG. 1) which is fed into the trigger threshold block 68 for adjusting the threshold depending upon the compressor load. It should be understood that the full rated motor current must be determined for each application and must be pre-set when the surge detection apparatus is installed.

A five-second delay timer 78 is connected to the output of the low-pass digital filter 64 so as to delay filtered RMS motor current by five seconds. Thus, the trigger thresholds will be based upon the steady-state current being drawn by the motor immediately prior to the instant that surge occurs. With this delay, the thresholds will not be affected by the sudden five to ten percent reduction in the RMS motor current which occurs at surge.

Figure 4:
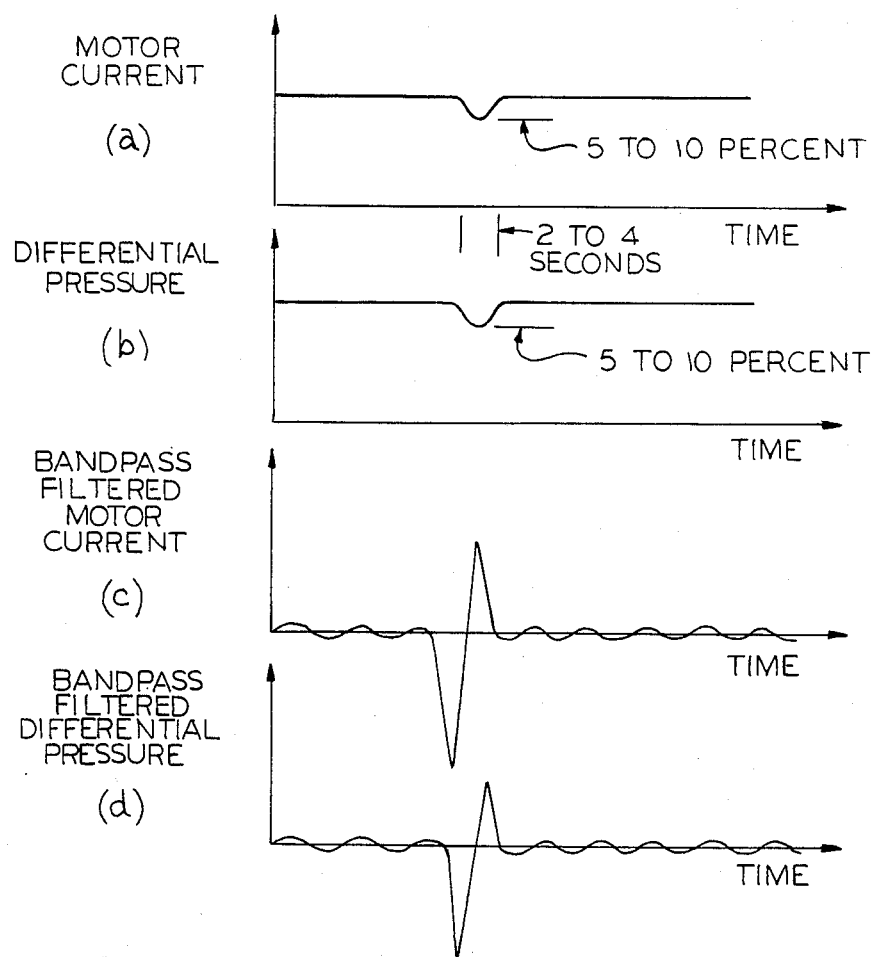
Figure 5:
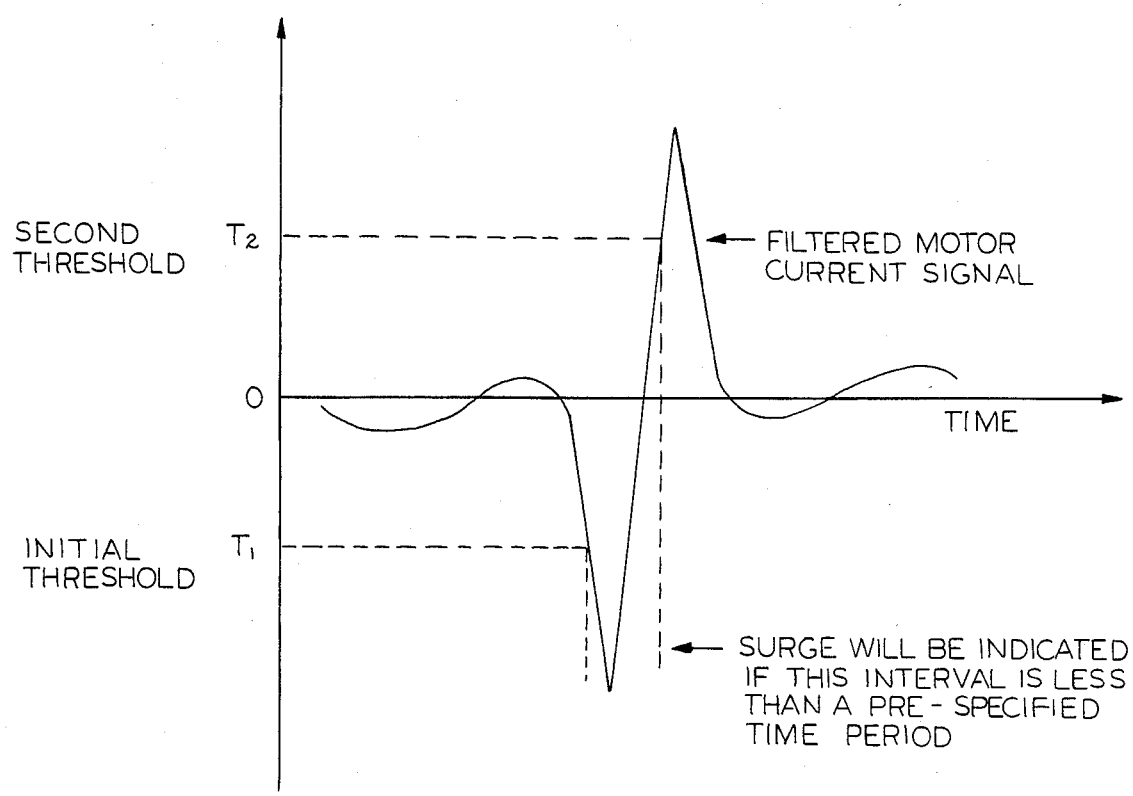

In order to provide an understanding of the operation of the present invention, reference is now made to FIGS. 4 and 5 of the drawings. In FIG. 4(a), there is shown a typical sensed or measured motor current signal which appears during surge on the line 42 from the low-pass filter 36. FIG. 4(b) depicts a typical measured differential pressure signal during surge which appears on line 56 from the functional block 50. FIG. 4(c) illustrates a typical bandpass filtered motor current signal found on line 63 from the bandpass filter 61. In FIG. 4(d), there is illustrated a typical bandpass filtered differential pressure signal found on line 60 from the bandpass filter 58.

In FIG. 5 of the drawings, there is illustrated graphically when a disturbance is to be interpreted as a valid surge. There are three requirements or conditions that must be satisfied before a true surge is to be indicated. The first requirement is that both the filtered motor signal "MAMPSFILT" from the bandpass filter 61 and the filtered differential pressure signal "DIFFPFILT" from the bandpass filter 58 must exceed trigger thresholds MAMPSFILT and DIFFPFILT. Once both trigger thresholds are exceeded, an interval timer is activated. The second requirement is that after the filtered motor current signal exceeds the initial threshold T1 it must reverse, pass through zero, continue in the opposite direction and exceed a second threshold T2. A waveform of a filtered motor current signal is depicted in FIG. 5 where the amplitude is plotted along the ordinate and the time is plotted along the abscissa. The initial and second thresholds are shown adjacent the ordinate axis. Finally, the third requirement is that the second or reversed filtered motor current signal must exceed the second threshold T2 before the interval timer, which was activated when the first requirement was satisfied, resets or expires. This reset interval is a pre-specified time period which is selected based upon the size of compressor. However, a reset time interval of three seconds is typically used in refrigeration applications.

Figure 2:
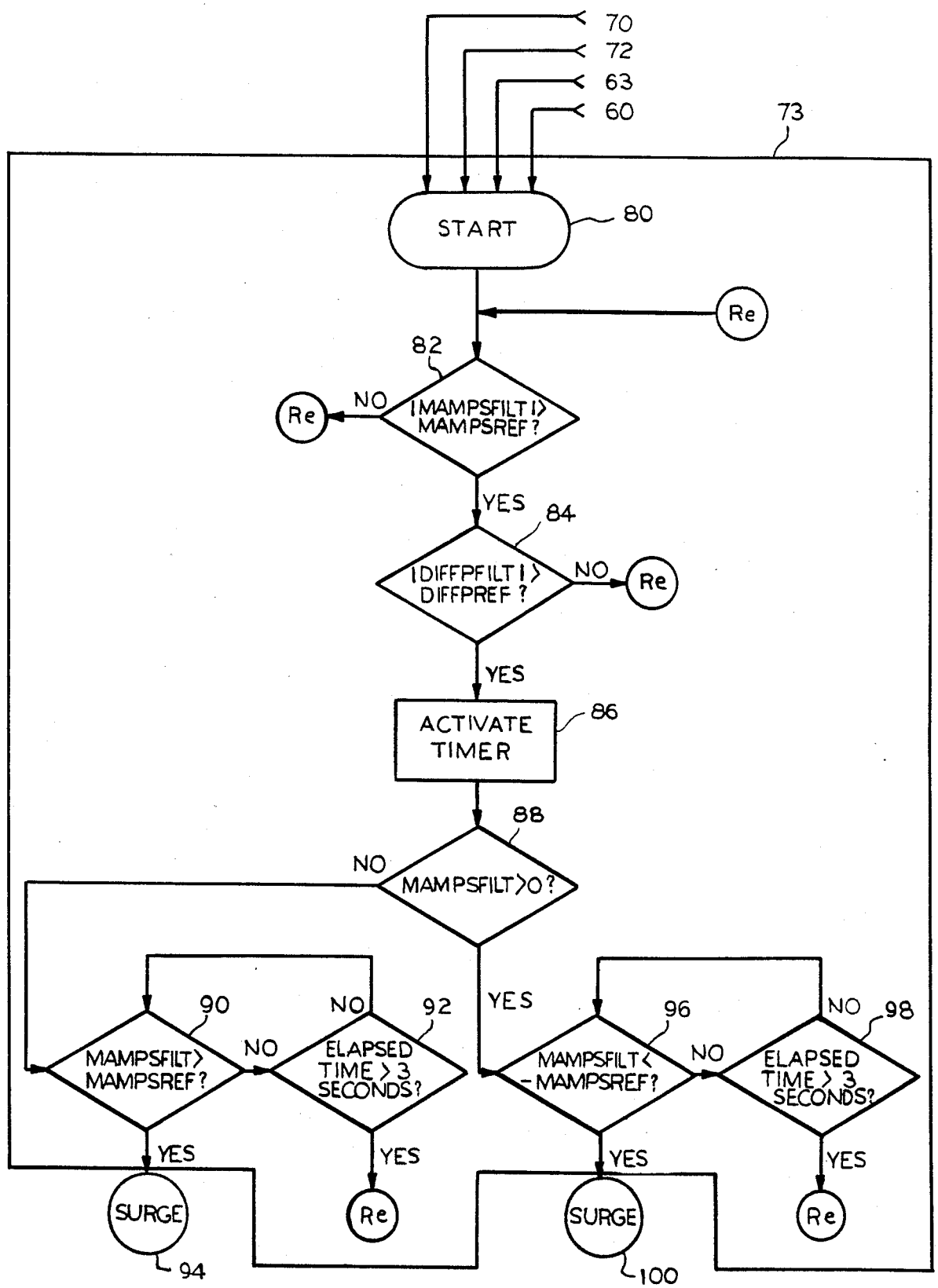
FIG. 2 is a more detailed diagram illustrating the microprocessor of FIG. 1 by way of a flow chart.

The details of a computing device such as a microprocessor 73 required to perform the function just described with respect to the operation of FIG. 5 are shown in FIG. 2 in a flow chart fashion. The microprocessor 73 receives as input signals the filtered motor current signal "MAMPSFILT" on line 63, the filtered differential pressure signal "DIFFPFILT" on line 60, the filtered current threshold "MAMPSREF" on line 70, and the filtered differential pressure threshold signal "DIFFPREF" on line 72 from the surge detection apparatus 10. The surge identification process is initiated by a start block 80 which causes the reading of the input signals on the respective lines 60, 63, 70, and 72. A logic or decision block 82 compares the absolute value of the filtered motor current signal "MAMPSFILT" against the filtered current threshold signal "MAMPSREF". A logic or decision block 84 compares the absolute value of the filtered differential pressure signal "DIFFPFILT" against the filtered differential pressure signal "DIFFPREF". If either threshold is not exceeded, the surge identification process is returned to the start block 80 in order to read the new input signals.

If both thresholds are exceeded, a timer block 86 is activated where the reset interval has been selected, in this instance, for a period of three seconds. The polarity of the first filtered motor current signal is determined by a block 88 which assigns a negative or positive sign to the second trigger threshold. If the polarity of the first filtered motor current signal is positive, then logic block 90 compares continuously the second filtered motor current signal against the second trigger threshold which is assigned a negative polarity. A logic block 92 determines when the three-second time interval has been exceeded. If the second threshold has been exceeded within this time interval, a valid surge is indicated by a surge identification block 94. Otherwise, the surge identification process is returned to the start block 80.

Similarly, if the polarity of the first filtered motor current signal is negative then a logic block 96 compares continuously the second filtered motor current signal against the second trigger threshold which is assigned a positive polarity. A logic block 98 determines when the three-second time interval has been exceeded. If the second threshold has been exceeded within this time interval, a valid surge is indicated by a surge identification block 100. Otherwise, the surge detection apparatus is returned to the start block 80.

From the foregoing detailed description, it can thus be seen that the present invention provides a surge detection apparatus for use in refrigeration systems having a centrifugal compressor driven by an electric motor which is based upon the rate of change of pressure developed across the compressor and the rate of change of current drawn by the compressor drive motor. Signals representative of the rate of change of the pressure developed across the compressor and the rate of change of the RMS motor current are generated by bandpass digital filters. A microprocessor responsive to these signals are provided for indication when a valid surge is occurring in the compressor.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A surge detection apparatus for use in a refrigeration system having a centrifugal compressor driven by an electric motor comprising:
   means for sensing a condenser pressure;
   means for sensing an evaporator pressure;
   means responsive to said condenser pressure and said evaporator pressure for generating a first signal representative of the rate of change of the pressure developed across the compressor;
   means for sensing a current in the electric motor driving the compressor;
   means responsive to said motor current for generating a second signal representative of the rate of change of the RMS current being drawn by the compressor drive motor;
   means for generating a third signal representative of a differential pressure threshold;
   means for generating a fourth signal representative of a first motor current threshold and a second motor current threshold; and
   computing means responsive to said first through fourth signals for indicating when a valid surge is occurring in the compressor.

2. A surge detection apparatus as claimed in claim 1, wherein said condenser pressure sensing means comprises a first pressure transducer.

3. A surge detection apparatus as claimed in claim 1, wherein said evaporator pressure sensing means comprises a second pressure transducer.

4. A surge detection apparatus as claimed in claim 1, wherein said means for generating the first signal comprises a low-pass filter coupled to said condenser pressure sensing means to produce a condenser pressure signal, a second low-pass filter coupled to said evaporator pressure sensing means to produce an evaporator pressure signal, means for subtracting the evaporator pressure signal from the condenser pressure signal and a bandpass digital filter coupled to said subtracting means for generating the first signal.

5. A surge detection apparatus as claimed in claim 1, wherein said current sensing means comprises a current transformer.

6. A surge detection apparatus as claimed in claim 1, wherein said means for generating the second signal comprises a third low-pass filter coupled to said current sensing means to produce a motor current signal and a second bandpass digital filter responsive to said motor current signal for generating said second signal.

7. A surge detection apparatus as claimed in claim 1, wherein the third signal representative of the differential pressure threshold is varied dependent upon the compressor load.

8. A surge detection apparatus as claimed in claim 1, wherein the fourth signal representative of the first motor current threshold and the second motor current threshold is varied dependent upon the compressor load.

9. A surge detection apparatus as claimed in claim 1, wherein said computing means includes means for comparing said first signal representative of the rate of change of the pressure developed across the compressor against said third signal representative of the differential pressure threshold and for comparing said second signal representative of the rate of change of the RMS motor current against the fourth signal representative of the first motor current threshold and the second motor current threshold, said computing means indicating that a valid surge is occurring when the differential pressure threshold and the first motor current threshold are both exceeded and the second motor current threshold is exceeded within a pre-selected time interval.

10. A surge detection apparatus for use in a refrigeration system having a centrifugal compressor driven by an electric motor comprising:
    means for sensing a condenser pressure;
    means for sensing an evaporator pressure;
    a first bandpass digital filter responsive to said condenser pressure and said evaporator pressure for generating a first signal representative of the rate of change of the pressure developed across the compressor;
    means for sensing a current in the electric motor driving the compressor;
    a second bandpass digital filter responsive to said motor current for generating a second signal representative of the rate of change of the RMS current being drawn by the compressor drive motor;
    means for generating a third signal representative of a differential pressure threshold;
    means for generating a fourth signal representative of a first motor current threshold and a second motor current threshold; and
    computing means responsive to said first through fourth signals for indicating when a valid surge is occurring in the compressor.

11. A surge detection apparatus as claimed in claim 10, wherein said condenser pressure sensing means comprises a first pressure transducer.

12. A surge detection apparatus as claimed in claim 10, wherein said evaporator pressure sensing means comprises a second pressure transducer.

13. A surge detection apparatus as claimed in claim 10, wherein said current sensing means comprises a current transformer.

14. A surge detection apparatus as claimed in claim 10, wherein said computing means includes means for comparing said first signal representative of the rate of change of the pressure developed across the compressor against the third signal representative of the differential pressure threshold and for comparing said second signal representative of the rate of change of the RMS motor current against said fourth signal representative of the first motor current threshold and the second motor current threshold, said computing means indicating that a valid surge is occurring when both the differential pressure threshold and the first motor current threshold are exceeded and the second motor current threshold is exceeded within a pre-determined time interval.

15. A method for detecting surge in a refrigeration system having a centrifugal compressor driven by an electric motor comprising the steps of:
   sensing a condenser pressure;
   sensing an evaporator pressure;
   generating a first signal representative of the rate of change of the pressure developed across the compressor in response to the condenser pressure and the evaporator pressure;
   sensing a current in the electric motor driving the compressor;
   generating a second signal representative of the rate of change of the RMS current being drawn by the compressor drive motor in response to the motor current;
   generating a third signal representative of a differential pressure threshold;
   generating a fourth signal representative of a first motor current threshold and a second motor current threshold; and
   indicating when a valid surge is occurring in the compressor in response to the first through fourth signals.

16. A method for detecting surge as claimed in claim 15, further comprising the step of varying the differential pressure threshold dependent upon the compressor load.

17. A method for detecting surge as claimed in claim 15, further comprising the step of varying the first motor threshold and the second motor threshold dependent upon the compressor load.

18. A method for detecting surge as claimed in claim 15, wherein the step of generating the first signal includes a first bandpass digital filter.

19. A method for detecting surge as claimed in claim 15, wherein the step of generating the second signal includes a second bandpass digital filter.

20. A method for detecting surge as claimed in claim 15, further comprising the steps of comparing the first signal representative of the rate of change of the pressure developed across the compressor against the third signal representative of the differential pressure threshold, comparing the second signal representative of the rate of the RMS motor current against the fourth signal representative of the first motor current threshold and the second motor current threshold, and indicating that a valid surge is occurring when both the differential pressure threshold and the first motor current threshold are exceeded and the second motor current threshold is exceeded within a pre-determined time interval.

21. A surge detection apparatus for detecting surge in a compressor of a compressor-driven system comprising:
   means for generating a first signal representative of the rate of change of the pressure developed across the compressor;
   means for sensing a current in an electric motor driving the compressor;
   means responsive to said motor current for generating a second signal representative of the rate of change of the RMS current being drawn by the compressor drive motor;
   means for generating a third signal representative of a differential pressure threshold;
   means for generating a fourth signal representative of a first motor current threshold and a second motor current threshold; and
   means responsive to said first through fourth signals for indicating when a valid surge is occurring in the compressor.

* * * * *